April 24, 1962 P. R. GIRARDOT 3,031,340
COMPOSITE CERAMIC-METAL BODIES AND METHODS FOR
THE PREPARATION THEREOF
Filed Aug. 12, 1957
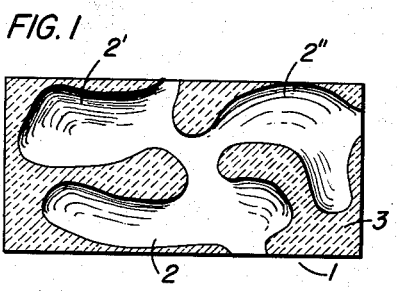
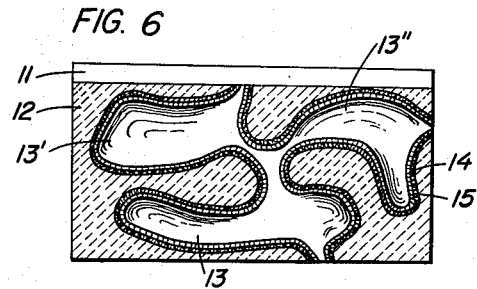
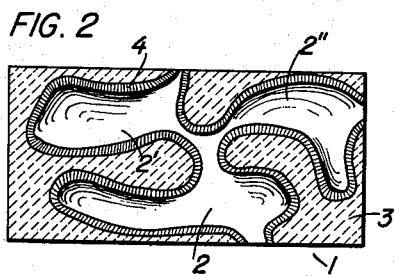
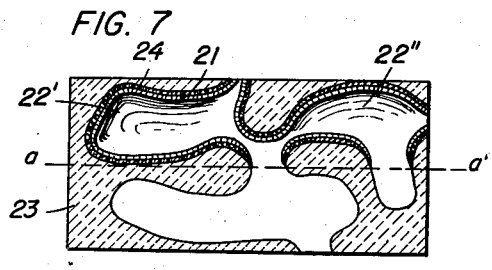
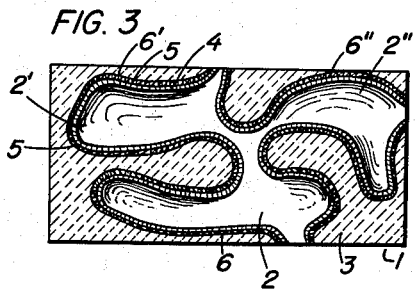
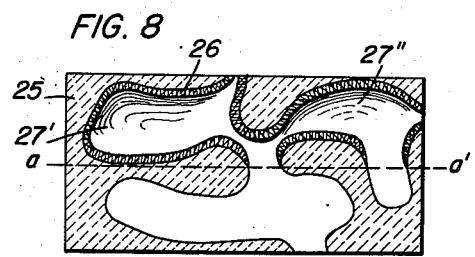
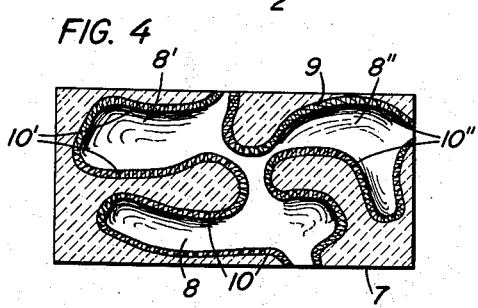
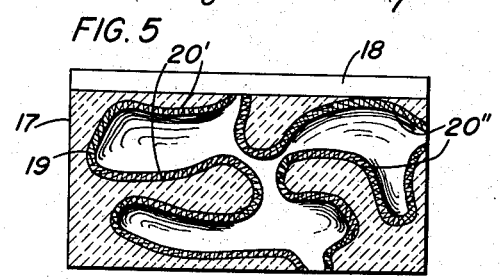
INVENTOR.
PETER R. GIRARDOT
BY
Attorney.

United States Patent Office
3,031,340
Patented Apr. 24, 1962

3,031,340
COMPOSITE CERAMIC - METAL BODIES AND METHODS FOR THE PREPARATION THEREOF
Peter R. Girardot, Akron, Ohio
Filed Aug. 12, 1957, Ser. No. 677,574
11 Claims. (Cl. 117—118)

This invention relates to articles and methods of manufacture and in particular to articles of manufacture comprising metals and ceramic and to methods for producing said articles.

The present invention purposes the manufacture of articles comprising metal and ceramic by producing porous bodies from either metal or ceramic followed by coating the pores contained in the porous body preferably with the other ingredient, the resultant body is then exposed to sufficient heat to produce a metal-ceramic composite.

An object of the present invention is to provide a metal-ceramic combination of improved properties.

Another object of the invention is a metal-ceramic article having continuous phases of ceramic, metal and chemically associated ceramic-metal reaction product.

Another object of the invention is a metal-ceramic article comprising a porous ceramic body containing within said pores a metal, said article formed by the application of heat thereto.

Other objects are methods for preparing the said structure and structural materials.

Further objects will become apparent from the following detailed description in which it is my intention to illustrate the applicability of the invention without limiting its scope to all those equivalents which will be apparent to one in the art and in which:

FIGURE 1 is an enlarged cross-sectional view of one embodiment of a porous body employed in the invention;

FIGURE 2 is an enlarged cross-sectional view of an embodiment showing the porous body after impregnation;

FIGURE 3 is an enlarged cross-sectional view of a portion of an article of the invention;

FIGURE 4 is an enlarged cross-sectional view of a portion of an article of the invention;

FIGURE 5 is an enlarged cross-sectional view of a portion of an article of the invention;

FIGURE 6 is an enlarged cross-sectional view of a portion of an article of the invention;

FIGURE 7 is an enlarged cross-sectional view of a portion of an article of the invention;

FIGURE 8 is an enlarged cross-sectional view of a portion of the article of the invention.

Metals and ceramics may be utilized in a variety of manners to produce articles in accordance with the invention.

As shown in the figures, a ceramic body 1 may be made from ceramic particles sintered to produce a body having interconnected pores 2, 2' and 2" within a ceramic matrix 3. These pores 2, 2' and 2" may be coated with a metal 4. The resultant body may then be exposed to heat to form a metal-ceramic material 5 between the ceramic walls 6, 6' and 6" of the pores 2, 2' and 2" and the metal coating 4 by the interaction of said metal and the ceramic 3.

By controlling the amount of metal coated on the ceramic walls of the pores of the ceramic body, an article such as that shown in FIGURE 4 may be produced. In this article, the metal has been completely spent in the formation of the metal-ceramic layer. It may thus be seen that FIGURE 4 consists of a ceramic body 7 having interconnected pores 8, 8' and 8" therein and having a metal-ceramic material 9 on the ceramic walls 10, 10' and 10" of the pores contained in said body.

It is also possible to coat a solid metal article 11 with a relatively thick layer of refractory material and the refractory material may then be sintered to form a body 12 of interconnected pores 13, 13' and 13" in a refractory matrix. Molten metal 14 may then be forced into the porous body 12 by means of pressure. After this addition the resultant body may be exposed to heat to cause the formation of a ceramic metal layer 15 between the metal and the ceramic walls of the pores of the ceramic layer which form an adherent coating to said solid metal article as shown in FIGURE 6.

If preferred, a relatively thin coating of metal may be deposited on the ceramic walls of the pores of a ceramic body 17 which is formed on and firmly adherent to a solid metal article 18. The resultant body may then be exposed to heat to produce a solid metal article 18 having a ceramic layer 17 which has a metal ceramic layer 19 contained on the ceramic walls 20, 20' and 20" of the pores of the ceramic; the metal coating being completely spent in the formation of said layer as shown in FIGURE 5.

Another variation which may be applied to the invention is shown in FIGURE 7 and the variation is produced by the partial infiltration of metal 21 into the interconnected pores 22 and 22" of the ceramic body 23 so that after exposure to additional heating a metal-ceramic material 24 between the metal 21 and the walls of the pores of the ceramic body is formed. FIGURE 7 shows a body which comprises a ceramic body 23, a metal 21 penetrating to the depth indicated by line $aa'$ and coating the walls of the pores 22' and 22" and a metal ceramic material 24 formed by the interaction of the ceramic and the metal and existing thereinbetween.

By controlling the amount of the metal coated on the pore walls and the depth of penetration, it is possible to produce the article of FIGURE 8. This means gives a ceramic body 25 consisting of interconnected pores 27' and 27" in a ceramic matrix and a metal-ceramic material 26 formed by the interaction of a metal completely consumed during formation of the metal ceramic and the ceramic of the body as shown in FIGURE 8; and the metal-ceramic material 26 penetrating to the depth indicated by line $aa''$ and completely consumed during the formation of the metal-ceramic layer.

In accordance with my invention, I use one of the ingredients, preferably the refractory material component, but sometimes a high melting metal (melting above 1500°) in a finely sub-divided form. I compress and partially sinter this, so as to cause an at least partial fusion of the particles at their points of contact. While still retaining porosities in this manner, I obtain a porous body comprising interconnected pores in a matrix. Then I bring about an infiltration and/or continuous deposition of the other ingredient, so that a coating of the walls of said pores is formed. If the porous body is a metal, the coating may be formed by forcing in a fused refractory material having a lower melting point than the metal, under vacuum or pressure into the pores. If the porous body is a refractory material, the metal may be added in the form of a liquid, vapor or heat decomposable salt.

Following this step of infiltration or deposition to form a coating in the pores of the porous body, I may heat and may simultaneously compress the composite material so as to cause a sintering of the entire mass. In this last step the cermetization of the composite material occurs, if it has not already partially occurred in a preceding step. This last step may also be combined with the preceding step, as for example, when a metal salt is deposited within the pores of a refractory material, and is at the same time reduced to metal and cermetized in a combined process. Likewise the evaporation of solvent from a metal solution or of dispersing medium from a metal sol may be combined with the final heating step in which cermetization or formation of the metal-ceramic layer occurs.

Example 1

Aluminum oxide, having an average particle size of 7 microns is compacted by pressing at 500 p.s.i. and is then sintered at a temperature of 1600–1800° F. The resultant porous body is warmed to 200° F. and a mixture of 3 parts by weight of nickel carbonyl and 2 parts by weight of chromium carbonyl is forced into the pores by 30 p.s.i. pressure. The temperature of the porous body is raised to 400° F. whereupon metal deposition takes place to the porous body. The continuity of the metal body can be shown by electrical resistance measurement.

The body is then heated to a temperature of 2100–2500° F. for 2 hours in a non-oxidizing atmosphere. The atmosphere of residual gaseous carbonyl is satisfactory. In the zone of contact between the aluminum oxide and the metal alloy deposited, a reaction takes place, forming a metal-ceramic layer of a cermet-type composition.

Example 2

Zirconium carbide, having an average particle size of 20 microns, is compacted at 5000 p.s.i., and heated to sintering temperature (approximately 3000° F.). Under these conditions a porous zirconium carbide body is formed. Into this body is forced liquid titanium under a pressure of 2000 p.s.i. and at a temperature of 3350° F. The resultant product is heated in an atmosphere of moist hydrogen for 8 hours at a temperature greater than 3000° F. but less than 3300° F. The resultant product shows excellent mechanical properties.

Example 3

A tube, made by partially sintering a refractory composition of boron carbide 2 parts and tungsten carbide 5 parts at 3000° F. has an outer diameter of 10″ and a wall thickness of 2″. The tube is closed at one end connected with a vacuum pump at the other end, heated to a temperature between 260° and 400° F., and placed in a chamber filled with chromium carbonyl for 60 seconds. The carbonyl enters and decomposes, leaving a dense chromium deposit at the outermost layer of the tube, said deposit decreasing in density toward the inner portions, and ceasing substantially at the inner half of the tube. The tube is then heated 1 hour to 2000° F. in a reducing atmosphere. The resultant article has a far higher impact resistance and density than the original refractory tube.

Example 4

A rod-shaped form is made by sintering titanium dioxide powder at 2640° F. for ½ hour under a pressure of 300 p.s.i. The porous rod is then heated to 2400° F. under vacuum and suspended in a stream of vapor of boiling calcium. When the boiling of the calcium is stopped after 15 minutes by cooling, metallic calcium deposits within the pores of the titanium dioxide body. By heating this composite material for 30 minutes to 1 hour at 2900° F., a reaction between the constituents occurs forming in part calcium titanate. The resulting rod has higher impact and tensile strength than a similar rod of titanium dioxide or of surface impregnated titanium dioxide not subsequently reheated.

Example 5

Boron nitride powder is compacted at 2000–3500 p.s.i. and heated to 3100° F. for 1 hour. Its temperature is then lowered to 2800° F. under vacuum and it is exposed to vapors of beryllium metal until the entire body is saturated (10 to 30 minutes). It is removed from the beryllium vapor and heated to 3500° F. in a nitrogen atmosphere for 2½ hours. The resulting reaction at the interface between the boron nitride body and the beryllium coating is the formation of a mixture of beryllium nitride and boride. The compacted material so made is less brittle than boron nitride alone and retains a high temperature corrosion resistance. This example is also applied to boron carbide and manganese metal, wherein the temperature during exposure to metal vapor is 3500° F. and the final heating step takes place at 3800° F.

Example 6

A porous sintered body of tungsten carbide is soaked for 30 minutes in a saturated solution of cobaltous oxalate in 15% aqueous ammonia, while a vacuum of 20–100 mm. of mercury is applied to the containing vessel. The sintered body is removed from the solution, heated at a rate of temperature increase of 5° F. per minute for one hour, then heated to 750° F. under vacuum for one hour. Cobalt metal is thereby deposited within the pores of the sintered body. Continued heat treatment at 2200° F. for 2 hours causes interaction between cobalt and tungsten carbide, forming a new phase, a metal-ceramic reaction product having higher temperature stability than tungsten carbide not so treated, or than tungsten carbide combined with metal, but not subsequently heat treated for enhanced stability nor so intimately combined.

Example 7

Powdered molybdenum boride, 400 mesh, is formed by means of a mold into a turbine blade under a pressure of 3500 p.s.i. and sintered at approximately 3000° F. The blade is immersed in a saturated solution of nickel formate in water at a pressure of 50 mm. of mercury for two hours. It is removed from the solution, heated at a rate of temperature increase of 5° per minute for one hour, further heated to 400° F. for one hour, then finally heated to 1650° F. for two and one half hours. The nickel formed in decomposition of nickel formate interacts with molybdenum boride during the last step of heating to form a metal-ceramic reaction product. The resulting turbine blade has a greater impact resistance and tensile strength than one mat so treated.

Example 8

A powdered mixture of boron carbide 19 parts by weight and boric oxide 1 part by weight is partially sintered at 870° F. for 20 minutes. It is cooled and immersed in a saturated solution of zirconium tetrachloride in benzene under a dry inert atmosphere at a pressure of 50–150 mm. of mercury for 1 hour. It is removed from the solution, heated to 200° F. for one-half hour, then heated to 625° F. for three hours. The partial reaction occurring within the porous body to form zirconium borides is completed by heating to 2750° F. for two hours. The sintered body then comprises two interlocking networks of high temperature resistant material more thermally stable than a similar body of either alone.

Example 9

A titania crucible, fired to approximately 15–20% porosity, is immersed in a saturated solution of calcium in liquid ammonia; entrapped air is removed by rapidly lowering the pressure for 30 seconds. The crucible after removal from the solution, is allowed to stand for two hours or until the odor of escaping ammonia is no longer noticeable. The crucible is then heated to approximately 2800° F. for 30 minutes, forming in part calcium titanate within the crucible structure, thereby changing its electrical resistance markedly.

Example 10

A mixture of zirconium powder 985 parts and carbonyl iron powder 15 parts by weight is compacted into flared tubular engine exhaust parts. These parts are immersed in a saturated solution of magnesium in liquid ammonia or an alkylamine, and entrapped air in the part removed by rapid pressure lowering for 30 seconds. The part is then heated in an atmosphere of ammonia to 650° F. for three hours, then is heated to approximately 2900° F. for an additional three hours. The last heating step may be in an atmosphere of ammonia, or may be in air. The resulting material comprises a mixture of zirconium nitrides, magnesium oxide, zirconium, and iron compounds, which has enhanced resistance to corrosion by exhaust gases.

*Example 11*

Sintered porous titanium carbide is dipped repeatedly into a sol of very fine divided chromium metal in benzene. The sol is commonly stabilized by the addition of low percentages of rubber. After each dipping, the benzene is evaporated by warming the titanium carbide when the weight increase of the carbide mass has reached 15% after evaporation of benzene, the mass is heated to approximately 2850° F. for five hours, causing reaction between the chromium particles and the titanium carbide to occur in part. Tensile strength and creep resistance are thereby enhanced.

*Example 12*

Sintered porous tungsten carbide is dipped repeatedly into a sol of metallic cadmium suspended in ethyl alcohol and the alcohol evaporated by warming after each dip. When the weight increase of the tungsten carbide has reached 25% after evaporation of the alcohol, the carbide is heated to approximately 3400° F. for two hours. The resulting body is useful for cutting tools, aircraft engine parts, and high temperature supports where exposure to flame occurs.

*Example 13*

A metal alloy turbine blade is dipped repeatedly into a slip of titanium dioxide in water until a uniform coating approximately 0.005" thick has been deposited. The coating is thoroughly dried, then dipped into a saturated solution of zirconium tetrachloride in benzene under a protective atmosphere of nitrogen. The benzene is evaporated by warming and the dipping and solvent evaporation repeated. Subsequent heating to 600° F. for one hour, then to 1800° F. for 2½ hours produce an adherent protective coating of higher temperature resistance and melting point than one of titanium dioxide alone.

*Example 14*

A tube fabricated of nickel-chrome alloy is coated on all of its surfaces with a thin layer of boron carbide by repeated dipping into a slip of the carbide or by spraying. It is heated to a temperature between 300 and 400° F. and placed in a chamber where it is exposed to chromium carbonyl gas. The carbonyl decomposes in the layer of carbide, leaving chromium metal deposited therein. The tube is then heated 1 hour to 2000° F. in a reducing atmosphere of hydrogen, causing reaction between the chromium and the carbide, forming in part chromium carbide. The resulting adherent coating has higher impact and corrosion resistance than the original alloy tube.

While the examples have shown certain specific embodiments it is understood that wide variations are permissible. The inventive concept is concerned preferably with the use of a ceramic or refractory body or porous structure and a metallic coating or porous structure of cermet-type material where said ceramic and said metal contact one another or alternatively a porous metal body and a ceramic-type coating or porous structure where said metal and said ceramic contact one another. The term "metal" is employed in a broad sense, to include combinations and alloys of several metallic elements, as well as the elements themselves. The order of the preparation of the networks or porous structures may be varied. Articles made from the compositions disclosed are also envisaged.

The process and the articles made thereby differ from, and are superior to previous processes and articles. The final heat treatment causes reaction to occur between a metal and a refractory or ceramic phase which otherwise does not occur, thereby producing articles in which interaction phases are caused to exist. These interaction phases are themselves materials contributing materially to the increased temperature resistance, strength, creep resistance and other desirable physical properties. The process is superior to those in which refractory powders are coated with metal, then sintered, since primary bonding of the sintered mass in the latter case is via metal bonds alone, whereas in my process primary bonding in the analogous case is via ceramic and cermet bonding. When the porous body is metal in my process the primary bonds are metal, but at the same time cermet-type bonding also occurs, enhancing desirable properties.

The porous body used in the invention is preferably prepared by sintering, however, other porous bodies may be used therefor, as long as the bodies consist of interconnected pores in a matrix and said pores form a continuous phase and said matrix forms a continuous phase. The body thus formed should be such that another ingredient added thereto will also form a continuous phase.

Materials preferred for impregnation into the porous body include: carbonyl-forming metals, volatile metal chlorides, heat-decomposable metal salts of organic acids, alloys of titanium, chromium, silicon, nickel, cobalt, molybdenum, tungsten, niobium, tantalum, manganese, iron, vanadium, zirconium, hafnium, volatile metal compounds, oxides of earth alkali metals, aluminum, silicon and boron. Ceramic material may also be used for impregnation into the porous body.

Ceramic materials preferred for use in the porous body include: alumina, titanium dioxide, zirconium dioxide, silicon dioxide, thorium dioxide, beryllium oxide, magnesium oxide, beryllium carbide, boron carbide, titanium carbide, boron nitride, titanium boride, chromium boride, molybdenum boride, zirconium carbide, barium titanate, calcium titanate, lead titanate, zirconium boride, $2FeO \cdot SiO_2$,
$CaO \cdot MgO \cdot 2SiO_2$,
$FeO \cdot Al_2O_3$,
$MgO$—$3CaO \cdot MgO \cdot 2SiO_2$—$CaO \cdot MgO \cdot SiO_2$ eutectic,
$MgO$—$CaO \cdot MgO \cdot SiO_2$—$2MgO \cdot SiO_2$ eutectic,
$CaO \cdot SiO_2$,
$CaO \cdot Al_2O_3 \cdot 2SiO_2$,
$MgO$—$2CaO \cdot SiO_2$—$3CaO \cdot MgO$—$2SiO_2$ eutectic,
$FeO \cdot Fe_2O_3$,
$MgO \cdot Fe_2O_3$,
$Al_2O_3 \cdot SiO_2$,
$3Al_2O_3 \cdot 2SiO_2$,
$Mgo$—$2Mgo \cdot SiO_2$ eutectic,
$2Mgo \cdot SiO_2$,
$2CaO \cdot SiO_2$,
$MgO \cdot Al_2O_3$,
$FeO \cdot Cr_2O_3$,
$MgO$—$2CaO \cdot SiO_2$ eutectic,
$MgO \cdot Cr_2O_3$ and
$MgO$—$CaO$ eutectic.

In the preferred form of the invention, a porous ceramic body after preparation may be impregnated with a metal in the form of a liquid vapor or heat decomposable salt. The depth of impregnation is subject to variation and depends on the depth desired. In some cases impregnation only part way into the body is desired to obtain a ceramic body having an outer layer of metal and metal-ceramic material.

The impregnation, when metal is to be deposited in a ceramic body, may be accomplished preferably by deposition from metallic vapor, deposition from liquid phase or deposition from solution.

When metal is to be deposited from metallic vapor, the partially sintered refractory material is heated to a temperature such that deposition of metal will not occur, and the metal vapor allowed to diffuse into the porous refractory material. This temperature is characteristic for each metal-ceramic combination. On chilling the refractory body, deposition of the metallic vapor as metal within the interstices occurs.

When metal is to be deposited from the liquid phase, liquid metal is forced under pressure into the refractory material interstices while the refractory material is heated. On cooling the refractory material, the freezing metal is deposited within the interstices. Control of pressure determines depth of penetration of the metal into the refractory body as well as degree of penetration into progressively finer and finer interstices within the refractory body.

When metal is to be deposited from solution, solutions of metal salts are forced into a partially sintered refractory material, the solvent evaporated, and the deposited metal salts reduced to metal by, for example, hydrogen or carbon monoxide. Other means of reduction such as electrolytic processes may be employed. Thermal reduction is also useful as with heavy metal or noble metal salts. This means of metal deposition is not limited by the means of salt reduction. Another application of deposition from solution is by means of solutions of metals themselves in special solvents such as alkali metals in liquid ammonia or amines. In the aforementioned case, the alkali metal deposited from these solutions on evaporation of solvent may undergo spontaneous reaction with the refractory material because of its high reactivity. The reaction product is useful as a ceramic-metal type material. Still another application of this method of deposition is the use of metal sols, colloidal dispersions of metals in dispersing media. The sol is forced into the refractory material interstices, and the dispersing medium is evaporated, leaving finely divided particles of metal within the refractory body.

The preferred temperature for use in the invention depends on the materials employed. If partially sintered ceramic is to be used as the body into which metal is to be impregnated, the temperature used must be great enough to allow deposition of the metal and formation of the ceramic-metal but not so great as to cause deleterious effects to the ceramic body. If partially sintered metal powder is to be used as the body into which ceramic is to be impregnated, the temperature used is great enough to allow deposition of the ceramic and formation of the ceramic-metal material but not so great as to cause deleterious effects to the metal or ceramic.

In some cases, where metal is to be infiltrated into a ceramic body, various methods may be employed to bring about this infiltration and various metals and metal compounds may be utilized. In some cases, it may be necessary to use a pressure apparatus so the metal may penetrate the interconnected pores of the ceramic through the application of pressure and in other cases a vacuum system is needed.

Having thus disclosed my invention, I claim:

1. An article of manufacture comprising a porous ceramic body having interconnected pores throughout said body in a ceramic matrix, a metal coating on the ceramic walls of said pores throughout said article and a layer comprising the interaction product of the ceramic and the metal, said layer being between said metal layer and said ceramic walls of said pores.

2. An article of manufacture comprising a porous ceramic body having interconnected pores throughout said body in a ceramic matrix, a metal coating on the ceramic walls of said pores throughout said article and a layer comprising the interaction product of the ceramic and the metal, said layer lying between said metal layer and said ceramic walls of said pores, wherein said ceramic matrix is a continuous phase and said pores are a continuous phase.

3. An article of manufacture comprising a porous ceramic body having interconnected pores throughout said body in a ceramic matrix and a layer comprising the interaction product of ceramic and metal, said layer being on the ceramic walls of said pores throughout said body.

4. The method for producing an article of manufacture comprising the steps of sintering a multiplicity of ceramic particles to produce a porous ceramic body consisting of interconnected pores throughout said body in a ceramic matrix introducing into said interconnected pores of said ceramic body a metal to produce a metal coating on the ceramic walls of said pores throughout said body, treating the resultant body with sufficient heat to cause the formation of a metal-ceramic layer between said metal coating and said ceramic walls of said pores, said metal-ceramic layer consisting of the interaction product of said ceramic and said metal.

5. The method for producing an article of manufacture comprising the steps of sintering a multiplicity of ceramic particles to produce a porous ceramic body consisting of interconnected pores in a ceramic matrix, introducing into said interconnected pores throughout said body of said ceramic body a metallic vapor to produce a metal coating on the ceramic walls of said pores throughout said body, heat treating the resultant body to form a metal-ceramic layer between said metal coating and said ceramic walls of said pores, said layer consisting of the interaction product of ceramic and metal.

6. The method for producing an article of manufacture comprising the steps of sintering a multiplicity of ceramic particles to produce a porous ceramic body consisting of interconnected pores throughout said body in a ceramic matrix, introducing into said interconnected pores throughout said body of said ceramic body a liquid metal to produce a metal coating on the ceramic walls of said pores, heat treating the resultant body to form a metal-ceramic layer between said metal coating and said ceramic body of said pores, said layer consisting of the interaction product of said ceramic and said metal.

7. The method for producing an article of manufacture comprising the steps of sintering a multiplicity of ceramic particles to produce a porous ceramic body having interconnected pores in a ceramic matrix throughout said body introducing into said interconnected pores of said ceramic body a solution of metal salts, decomposing said salts to deposit the metal from said metal salts on the ceramic walls of said pores of said ceramic body throughout said body, heat treating the resultant ceramic body to form a metal-ceramic layer between said metal coating and said ceramic walls of said pores of said ceramic body, said layer consisting of the interaction product of said ceramic and said metal.

8. The method for producing an article of manufacture comprising the steps of compressing comminuted refractory material into a vessel, sintering said material to obtain a porous body of refractory material consisting of interconnected pores throughout said body in a ceramic matrix, removing said body from said vessel, introducing into said pores of said body a metal until said metal has partially penetrated the pores of said refractory body, heating said body to form a metal-ceramic layer between said metal coating and said ceramic walls of said pores of said ceramic body throughout said body, said layer consisting of the interaction product of said ceramic and said metal.

9. The method for producing an article of manufacture comprising the steps of sintering a multiplicity of refractory material particles to produce a porous ceramic body consisting of interconnected pores throughout said body in a ceramic matrix, introducing into said interconnected pores of said refractory material body a metal to produce a metal coating on the ceramic walls of said pores throughout said body, treating the resultant body with sufficient heat to cause the formation of an interlayer consisting of the interaction product of said metal and said ceramic by means of consuming substantially completely at least said metal coating.

10. The method for producing an article of manufacture comprising the steps of partially sintering a multiplicity of refractory material particles to produce a porous refractory body consisting of interconnected pores throughout said body in a ceramic matrix, introducing a metal until said metal has completely infiltrated said pores throughout said body and then treating the resultant body with sufficient heat to cause the formation of a metal-ceramic layer by consumption of said metal, said layer consisting of the interaction product of said metal and said ceramic.

11. The method for producing an article of manufacture comprising the steps of sintering a multiplicity of ceramic particles to produce a porous ceramic body having interconnected pores throughout said body in a ceramic matrix, introducing into said interconnected pores of said ceramic body throughout said body a decomposable metal compound, decomposing said compound to deposit the metal on the ceramic walls of said pores of said ceramic body throughout said body, heat treating the resultant ceramic body to form a metal-ceramic layer between said metal coating and said ceramic walls of said pores of said ceramic body throughout said body, said layer consisting of the interaction product of said ceramic and said metal.

References Cited in the file of this patent

UNITED STATES PATENTS

| | | |
|---|---|---|
| 1,884,665 | Greiner | Oct. 25, 1932 |
| 1,900,833 | Maul et al. | Mar. 7, 1933 |
| 1,987,683 | Hunt et al. | Jan. 15, 1935 |
| 2,108,513 | Shardlow | Feb. 15, 1938 |
| 2,491,284 | Sears | Dec. 13, 1949 |
| 2,553,759 | Geiger | May 22, 1951 |
| 2,619,432 | Hosmer | Nov. 25, 1952 |
| 2,636,244 | Williams | Apr. 28, 1953 |
| 2,667,427 | Nolte | Jan. 26, 1954 |
| 2,667,432 | Nolte | Jan. 26, 1954 |
| 2,672,426 | Grubel et al. | Mar. 16, 1954 |
| 2,685,542 | Woodburn et al. | Aug. 3, 1954 |
| 2,702,425 | Thompson | Feb. 22, 1955 |
| 2,706,682 | Barnard et al. | Apr. 19, 1955 |
| 2,715,593 | Clark | Aug. 16, 1955 |
| 2,734,857 | Snyder | Feb. 14, 1956 |
| 2,751,293 | Haller | June 19, 1956 |
| 2,768,099 | Hoyer | Oct. 23, 1956 |
| 2,775,531 | Montgomery | Dec. 25, 1956 |
| 2,790,731 | Ostrofsky et al. | Apr. 30, 1957 |
| 2,833,676 | Heibel et al. | May 6, 1958 |
| 2,843,507 | Long | July 15, 1958 |
| 2,856,313 | Gerber et al. | Oct. 14, 1958 |
| 2,858,235 | Rex | Oct. 28, 1958 |
| 2,903,788 | Pryslak | Sept. 15, 1959 |
| 2,918,392 | Beller | Dec. 22, 1959 |

OTHER REFERENCES

Bondley: Electronics, July 1947 (volume 20, pages 97–99).

Ser No. 137,892, Auwarter (A.P.C.), published June 15, 1954.

UNITED STATES PATENT OFFICE
CERTIFICATE OF CORRECTION

Patent No. 3,031,340                                         April 24, 1962

Peter R. Girardot

It is hereby certified that error appears in the above numbered patent requiring correction and that the said Letters Patent should read as corrected below.

Column 7, line 67, for "lying" read -- being --; column 8, line 17, strike out "throughout said body" and insert the same after "pores" in line 16; same column 8, lines 28 and 29, strike out "throughout said body" and insert the same after "pores" in line 31, same column 8.

Signed and sealed this 23rd day of October 1962.

(SEAL)
Attest:

ERNEST W. SWIDER                                    DAVID L. LADD
Attesting Officer                                        Commissioner of Patents